(12) United States Patent
Balto

(10) Patent No.: US 6,935,272 B2
(45) Date of Patent: Aug. 30, 2005

(54) ANIMAL TREATMENT/CONFINEMENT APPARATUS

(76) Inventor: Arlene Balto, 4006 Foss Rd., #205, St. Anthony Village, MN (US) 55421

( * ) Notice: Subject to any disclaimer, the term of this patent is extended or adjusted under 35 U.S.C. 154(b) by 244 days.

(21) Appl. No.: 09/773,334

(22) Filed: Jan. 31, 2001

(65) Prior Publication Data

US 2002/0100426 A1 Aug. 1, 2002

(51) Int. Cl.[7] .................................................. A01K 1/03
(52) U.S. Cl. .................... 119/417; 119/712; 119/678
(58) Field of Search ............................... 119/482, 496, 119/501, 671, 453, 513, 514, 751, 15, 416, 3, 19, 421, 417, 418; D30/119; 128/692; 604/259, 262

(56) References Cited

U.S. PATENT DOCUMENTS

| | | | |
|---|---|---|---|
| 1,956,499 A | | 11/1934 | Dworetzky |
| 3,897,751 A | * | 8/1975 | Gullino et al. .............. 119/420 |
| 4,269,149 A | | 5/1981 | Thomas |
| 4,279,361 A | * | 7/1981 | Chung ........................... 222/1 |
| 4,367,696 A | | 1/1983 | Hamann |
| 4,385,637 A | * | 5/1983 | Akhavi ...................... 600/576 |
| 4,508,123 A | * | 4/1985 | Wyatt et al. ................. 600/505 |
| D297,471 S | * | 8/1988 | Carlin ........................ D30/119 |
| 4,995,335 A | | 2/1991 | Wright |
| 5,009,189 A | * | 4/1991 | Neff ........................... 119/200 |
| 5,009,196 A | | 4/1991 | Young |
| 5,020,478 A | | 6/1991 | Salvatore |
| 5,109,801 A | | 5/1992 | Gahagan |
| 5,158,041 A | | 10/1992 | Schmitz |
| 5,163,923 A | | 11/1992 | Donawick et al. |
| 5,230,304 A | | 7/1993 | Santoro |
| 5,291,857 A | | 3/1994 | Braun, Jr. |
| 5,349,924 A | * | 9/1994 | Hooper, Jr. ................. 119/472 |
| 5,570,658 A | | 11/1996 | Hillery et al. |
| 5,603,288 A | | 2/1997 | Ferber |
| 5,772,443 A | | 6/1998 | Lampotang et al. |
| 5,816,256 A | * | 10/1998 | Kissinger et al. ........... 128/897 |
| 5,832,878 A | * | 11/1998 | Bonsall et al. .............. 119/769 |
| 5,927,234 A | | 7/1999 | Siegel |
| 5,988,110 A | * | 11/1999 | Peterson ..................... 119/453 |
| 6,062,224 A | * | 5/2000 | Kissinger et al. ........... 128/897 |
| 6,182,662 B1 | * | 2/2001 | McGhee ..................... 128/845 |
| 6,349,675 B1 | * | 2/2002 | Thrun ........................ 119/265 |

* cited by examiner

Primary Examiner—Peter M. Poon
Assistant Examiner—Timothy D Collins
(74) Attorney, Agent, or Firm—Shumaker & Sieffert, P.A.

(57) ABSTRACT

An animal treatment/confinement device is described, with apparatus to aid in the provision of medications, fluids or other supportive care therapy to the animal. The device includes a fluid container support used to support a fluid container, or a syringe cradle used to support a syringe, or both. The device includes a housing sized to receive an animal, and to confine the animal during the therapeutic treatment. The device may also include two top panels hingedly coupled to the housing, which open to allow the animal to be placed into the housing, and which close independently to cover a portion of the top opening. The top panels may be secured by clasps to hinder the animal's escape. In one embodiment, the top opening is not fully covered when both top panels are closed, allowing the animal's handler to have access to the animal.

14 Claims, 3 Drawing Sheets

US 6,935,272 B2

ANIMAL TREATMENT/CONFINEMENT APPARATUS

TECHNICAL FIELD

The present invention relates to animal care, and more particularly to apparatus for confinement and treatment of animals.

BACKGROUND

Pet owners and veterinarians may find it difficult to administer therapeutic treatment to pets, including administration of fluids, administration of medications and other supportive care therapy. Administration of therapeutic treatment is even more difficult when the treatment must be administered over a prolonged period of time, such as by subcutaneous administration, injection from a syringe, or by enteral or parenteral feeding.

SUMMARY

The present invention is directed to an animal confinement device having administration apparatus to aid in therapeutic treatment such as the provision of fluids, medications and other supportive care therapy. The administration apparatus includes a fluid container support, used to hold fluids for gradual administration, or a syringe cradle, used to support a syringe allowing more rapid administration, or both. The device includes a housing sized to receive an animal, such as a cat.

In one embodiment, the device includes a box-shaped housing sized to receive an animal. The housing includes a front panel, a rear panel, a bottom panel, and two side panels. A fluid container support is coupled to the housing, which supports a fluid container. The device may also include two top panels coupled by hinges to the housing, which open to allow the animal to be placed into the housing. Once the animal is placed into the housing through the top opening, the top panels may be closed independently to cover a portion of the top opening. The top panels may be secured by clasps to hinder the animal's escape. By covering less than one hundred percent of the top opening, the animal's handler has access to the animal, allowing not only administration of medicine or fluids but also a comforting touch. At the same time, the partial covering of the top aids in preventing the escape of the animal from the container. The device may further include a syringe cradle, which supports a syringe. In addition, a window may be provided in the front panel, covered by a grate, allowing the animal to see the outside environment.

In another embodiment, the present invention includes a housing sized to receive an animal and to confine the animal during therapeutic treatment and two top panels coupled to the housing. Once the animal is placed into the housing through the top opening, the top panels may be closed. The panels may not cover the top opening completely, so the handler may still have access to the animal. The apparatus may also include a fluid container support, a syringe cradle or both.

In a further embodiment, the present invention includes a housing sized to receive an animal and to confine the animal during therapeutic treatment, with a fluid container support coupled to the housing. The apparatus may also include a syringe cradle.

Other advantages, features and embodiments of the present invention will become apparent from the following detailed description, and from the claims.

DETAILED DESCRIPTION

Figure 1:
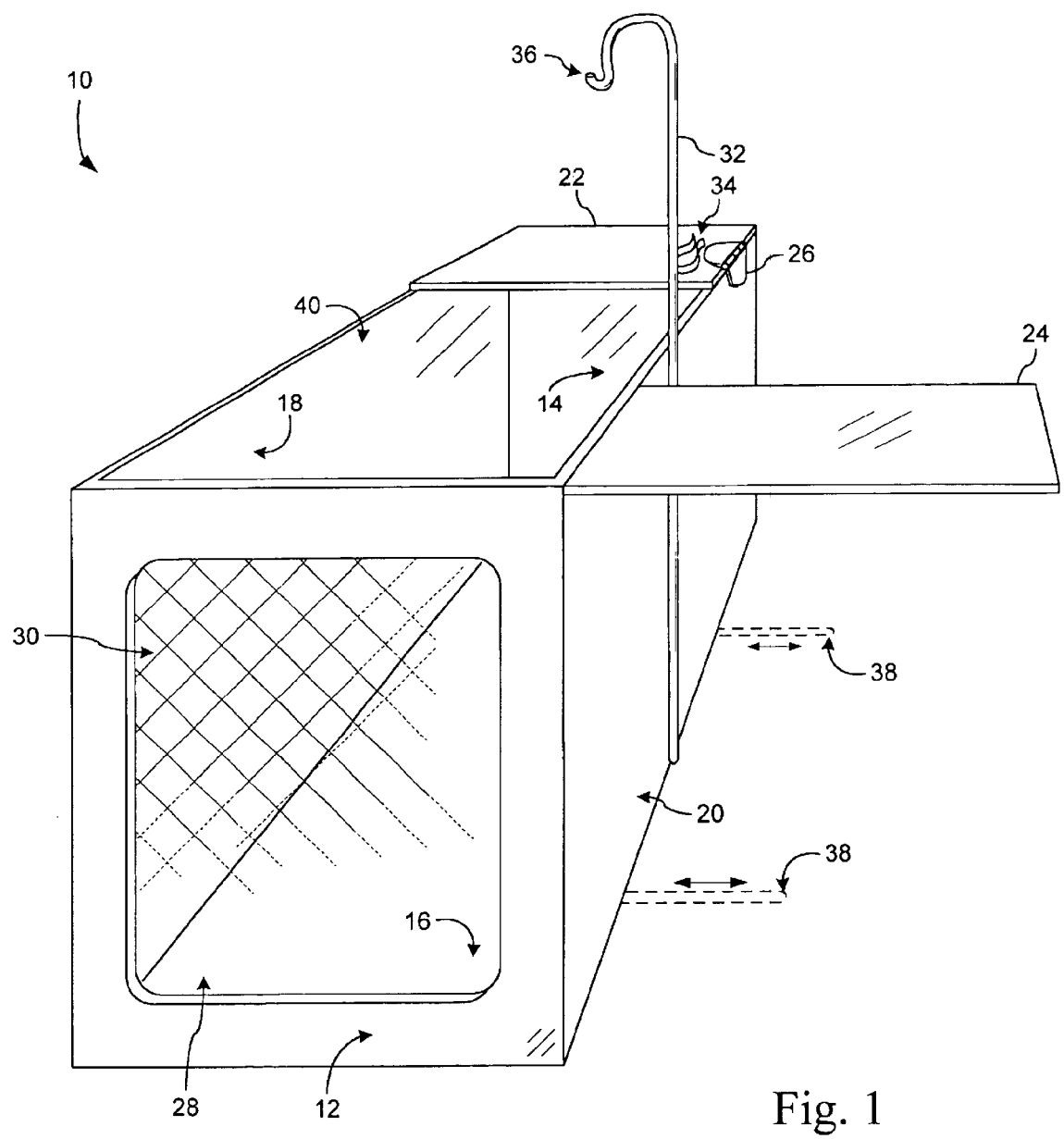
FIG. 1 is a perspective view of an animal medical confinement device.

FIG. 1 is a perspective view of an animal treatment/confinement device 10 in accordance with an embodiment of the present invention. Animal treatment/confinement device 10 assumes the form of a generally box-shaped housing sized to receive an animal, the housing including a front panel 12, rear panel 14, bottom panel 16 and side panels 18 and 20. Rear closure panel 22, coupled to side panel 20 by hinge 26, is ordinarily free to swing between an open and a closed position.

In FIG. 1, rear closure panel 22 is shown in a closed position. Similarly, front closure panel 24, coupled to side panel 20 by hinge 64 (shown in FIG. 3), is ordinarily free to swing between an open and a closed position, and is shown in FIG. 1 in an open position. Rear closure panel 22 and front closure panel 24 operate independently. The use of rear closure panel 22 and front closure panel 24 will be described in more detail below. Panels 12, 14, 16, 18, 20, 22 and 24 may be constructed from materials having the strength and rigidity to confine the animal and to support the administration apparatus that will be described below. Such materials may include metal, wood and plastic.

Front panel 12 includes a window 28, covered by a grate 30. Grate 30 may be manufactured of metal, plastic or other material strong enough to prevent the animal's escape. In ordinary usage, an animal placed into device 10 faces front panel 12, and is permitted to see the outside environment through window 28 and grate 30. Some animals feel less confined when they can see the outside environment, and are consequently more amenable to therapeutic treatment. Window 28 further offers the advantage of allowing a distraction to be offered to the animal.

Animal treatment/confinement device 10 includes post 32, which supports administration apparatus and aids in the provision of medications and fluids. FIG. 1 shows post 32 affixed to side panel 20. Post 32 may be affixed by various fasteners, such as screws, bolts or brackets. Alternatively, post 32 may be formed integrally with side panel 20, or may be partially housed within a sleeve defined by side panel 20. Post 32 may also include a portion that extends under bottom panel 16 and may be affixed to bottom panel 16. Although post 32 may be formed from various materials, post 32 may be required to support the weight of a fluid container 50 such as a drip bag (shown in FIGS. 2 and 3), and constructing post 32 from metal offers weight-bearing advantages.

Post 32 supports syringe cradle 34, which is configured to support syringe 54 (shown in FIG. 2) as will be explained in more detail below. In addition, post 32 includes a crook-shaped portion that serves as fluid container support 36. Fluid container support 36 is shown in FIG. 1 as substantially above side panel 20, so that fluid container support 36 does not interfere with placing the animal in device 10. To improve balance, animal treatment/confinement device 10 may include support apparatus to reduce the risk of tipping when a fluid container is borne by fluid container support 36. Tipping is more likely to occur when device 10 is made of lightweight material and when there is insufficient weight applied to bottom panel 16. FIG. 1 shows extendable braces 38 as one example of support apparatus. Extendable braces 38 may be housed in sleeves in bottom 16, extended to provide support when needed, and retracted when no longer needed. Many other types of support apparatus may be used, or bottom panel 16 may be weighted to enhance stability. Extendable braces 38 shown in FIG. 1 are intended for illustration and are not intended to limit the scope of the invention.

Figure 2:
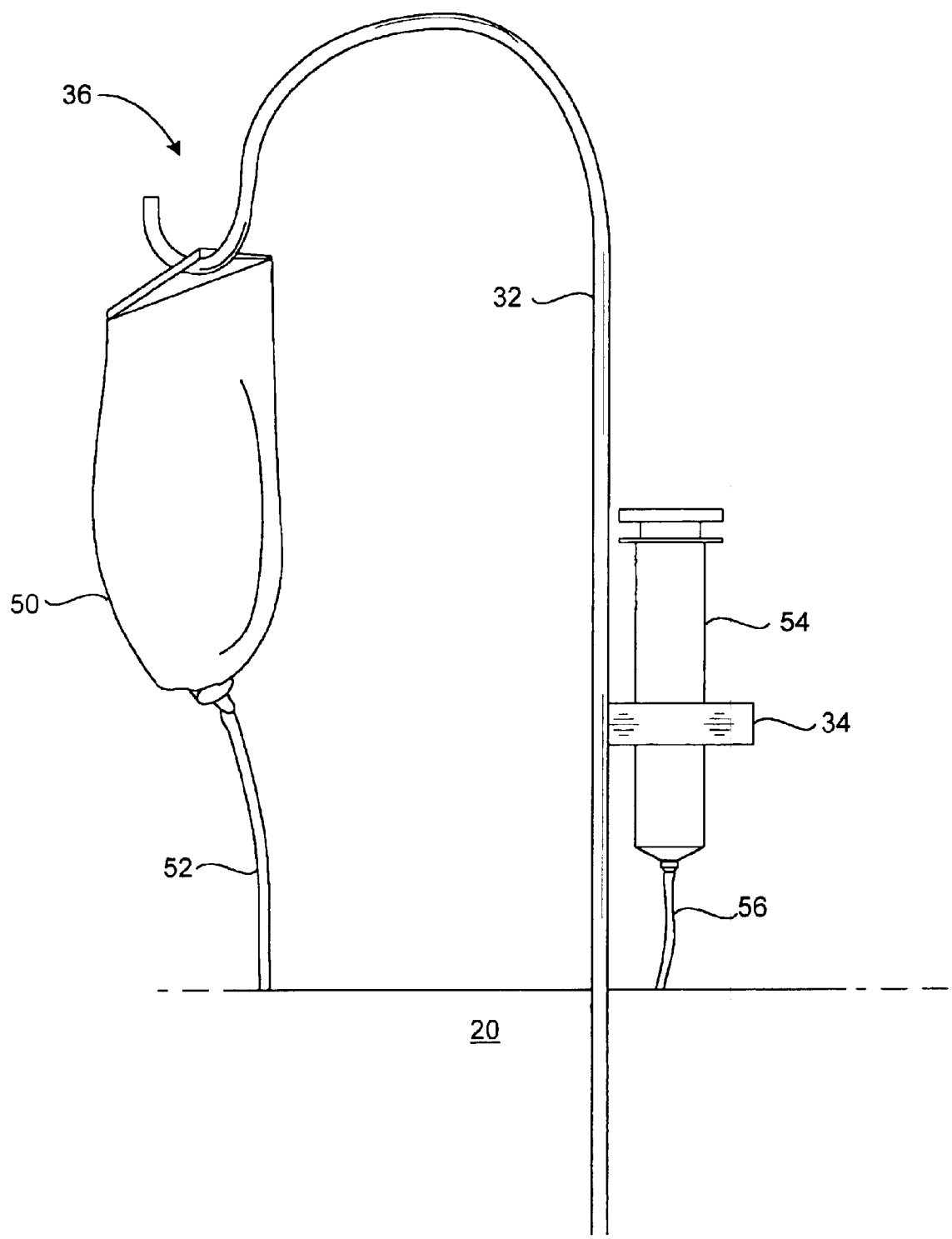
FIG. 2 is an elevational view of administration apparatus on an animal medical confinement device.

FIG. 2 depicts administration apparatus. In particular, FIG. 2 shows post 32, syringe cradle 34 and fluid container support 36 in use. Fluid container 50 is supported by fluid container support 36. Syringe 54 is supported by syringe cradle 34 and is configured to permit operation of syringe 54 with one hand. In an exemplary form shown in FIGS. 1 and 2, syringe cradle 34 includes a bracket, and is configured to allow syringe 54 to be snapped in and out of the bracket. Syringe cradle 34 may be coupled to post 32 in many ways, such as by screws, by bolts or by adhesives. The configurations of syringe cradle 34 and fluid container support 36 shown in FIGS. 1 and 2 are intended for illustration and are not intended to limit the scope of the invention.

In a typical case, fluid container 50 is used for more gradual administration of fluids, medicines or other supportive care therapy, and syringe 54 is used for less gradual administration. FIG. 2 depicts a case in which both forms of administration may occur simultaneously. Medicine or fluid administered by fluid container 50 is channeled to the animal through catheter 52, and medicine or fluid administered by syringe 54 is channeled through catheter 56. Medicine, fluid or other supportive care therapy may be applied as needed, such as intravenously, intramuscularly, subcutaneously or by enteral or parenteral feeding.

Figure 3:
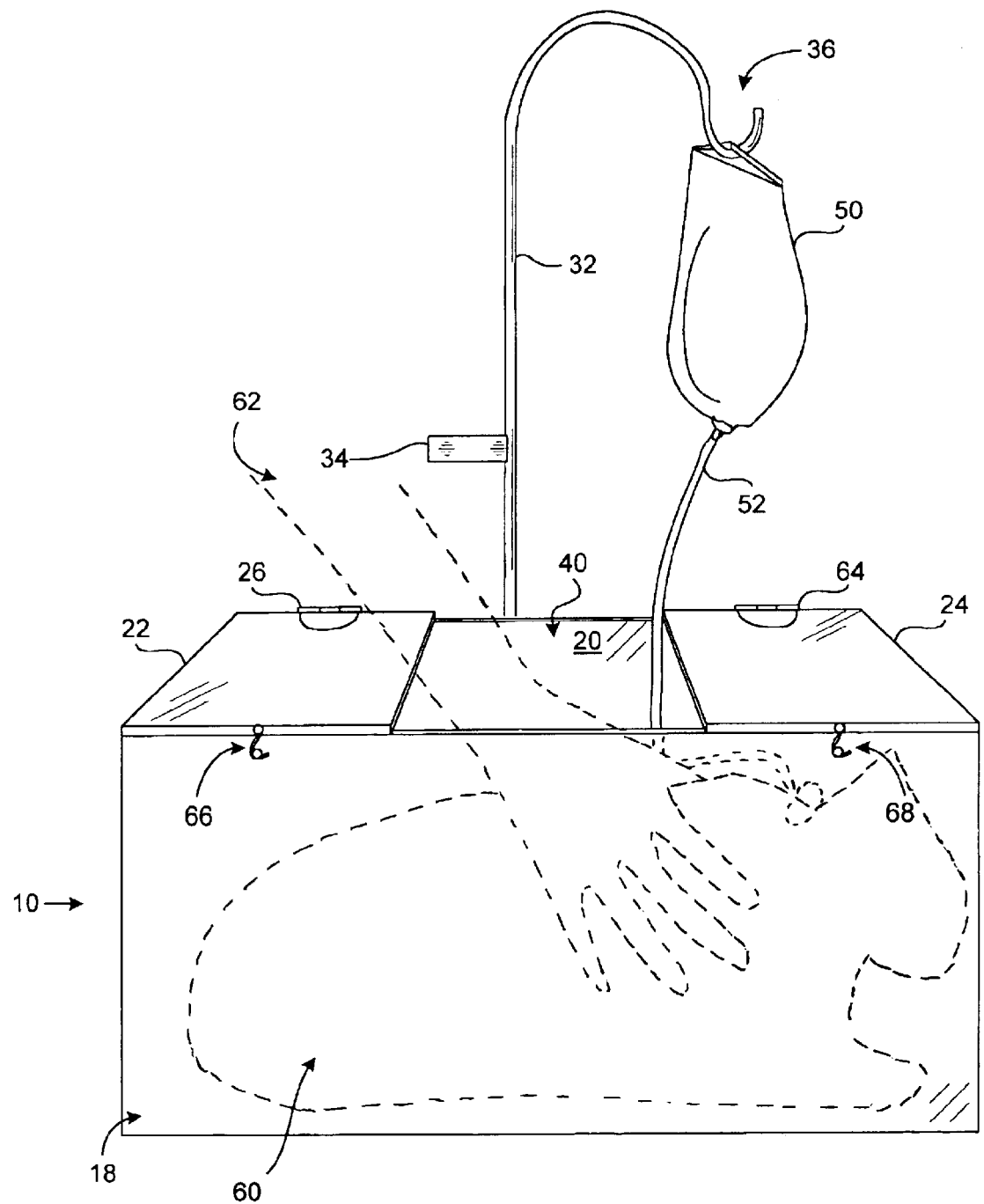
FIG. 3 is a perspective view of an animal treatment/confinement device, showing a typical use of the device.

FIG. 3 shows animal treatment/confinement device 10 in an exemplary use. For illustrative purposes, FIG. 3 depicts fluid administration to cat 60. Cat 60 is confined in device 10 while fluid is administered subcutaneously from fluid container 50 by handler 62. Handler 62 may be, for example, an owner or veterinarian.

In ordinary usage, cat 60 may be placed into device 10 with its hindquarters toward rear panel 14 and its head toward front panel 12. The animal maybe placed into device 10 rear feet first. As the animal is further lowered into device 10, rear closure panel 22 may be closed. Clasp 66 may be engaged to prevent the animal from opening rear closure panel 22 and escaping. While handler 62 restrains cat 60, such as by holding its collar, front closure panel 24 may be closed and may be secured with clasp 68. Alternatively, front closure panel 24 may be closed and clasped 68 before cat 60 is placed into device 10, then the animal may be introduced into device 10 head-first, after which rear closure panel 22 may be closed and clasped 66.

In the embodiment shown in FIGS. 1 and 3, rear closure panel 22 and front closure panel 24, when closed, do not completely cover top opening 40 of device 10. Rear closure panel 22 and front closure panel 24 each cover approximately thirty percent of top opening 40. As a result, a substantial percentage of top opening 40 remains uncovered, giving handler 62 freedom to touch cat 60 with one or both hands, and to administer therapeutic treatment as needed. Touching can prove soothing to cat 60 especially during administration of therapeutic treatment. Rear closure panel 22 and front closure panel 24 together may cover a larger or smaller percentage of top opening 40. When confinement device 10 is sized for a smaller animal, for example, rear closure panel 22 and front closure panel 24 may each cover a substantially smaller percentage of top opening 40 than is depicted in FIG. 3, thereby giving handler 62 freedom to touch the animal and to administer therapeutic treatment. Similarly, when confinement device 10 is sized for a larger animal, rear closure panel 22 and front closure panel 24 may each cover a substantially larger percentage of top opening 40 than is depicted in FIG. 3.

A number of embodiments of the invention have been described. The configuration of animal treatment/confinement device 10 shown in FIGS. 1, 2 and 3 is an exemplary configuration, and the invention is not limited to the shown configuration. Various modifications may be made without departing from the scope of the claims that follow. For example, another embodiment of the confinement device may include multiple windows instead of one, or the windows may be covered by glass, plastic bars or a window screen. An embodiment may hinge the closure panels on the side panel opposite the post, or may hinge the closure panels on the end panels. A further embodiment may include front and rear closure panels of unequal sizes. Different housing sizes may be used for treating different animals. A housing shape other than a box may be used to confine the animal, such as an oval-shaped housing, or a housing that allows more head room for the animal but less room for its hindquarters. The syringe cradle may be coupled to the confinement device at a site other than the post. The post may be telescoping or otherwise retractable. Other embodiments may include additional features, such as handles to enhance portability or interior padding for the comfort of the animal. These and other embodiments are within the scope of the following claims.

What is claimed is:

1. An apparatus comprising:
   a housing sized to receive a non-human animal and to confine the animal during therapeutic treatment comprising a front panel, a rear panel, a bottom panel, and two side panels, the housing being sized to receive the animal; and
   a drip bag support directly coupled to the housing; and
   a syringe cradle directly coupled to at least one of the housing and the drip bag support wherein the syringe cradle is adapted for holding a tubular shaped syringe by substantially encompassing the circumference of the syringe.

2. The apparatus of claim 1, further comprising:
   a first top panel hingedly coupled to the housing; and
   a second top panel hingedly coupled to the housing,
   wherein the housing defines a top opening and the first and second top panels are selectively positionable to cover at least a portion of the opening.

3. The apparatus of claim 2, further comprising a clasp, the clasp configured to secure a top panel in a closed position.

4. The apparatus of claim 1, wherein front panel defines a window, the apparatus further comprising a grate covering the window.

5. An apparatus comprising:
   a housing sized to receive a non-human animal and to confine the animal during therapeutic treatment; and
   a drip bag support directly coupled to the housing; and
   a syringe cradle directly coupled to at least one of the housing and the drip bag support wherein the syringe cradle is adapted for holding a tubular shaped syringe by substantially encompassing the circumference of the syringe.

6. The apparatus of claim 5, further comprising a top panel hingedly coupled to the housing.

7. The apparatus of claim 6, wherein the housing defines a top opening and wherein the top panel is a first top panel, the apparatus further comprising:

a second top panel, the first and second top panels configured to assume a closed position and wherein the top opening is at least in part uncovered when the first and second top panels are in a closed position.

8. The apparatus of claim 1, further comprising a post directly coupled to the housing, the post supporting the syringe cradle.

9. The apparatus of claim 1, wherein the bag support is crook-shaped.

10. The apparatus of claim 5, further comprising a post directly coupled to the housing, the post supporting the syringe cradle.

11. The apparatus of claim 5, wherein the drip bag support is crook-shaped.

12. The apparatus of claim 1, further comprising a support apparatus directly coupled to the housing, the support apparatus configured to stabilize the housing when a drip bag is supported by the drip bag support.

13. The apparatus of claim 12, wherein the support apparatus includes at least one extendable brace.

14. The apparatus of claim 5, further comprising a support apparatus directly coupled to the housing to stabilize the housing when a drip bag is supported by the drip bag support.

* * * * *